No. 853,557. PATENTED MAY 14, 1907.
J. E. LIEBHART.
COMBINED HAY BUCK AND STACKER.
APPLICATION FILED OCT. 15, 1906.
3 SHEETS—SHEET 1.
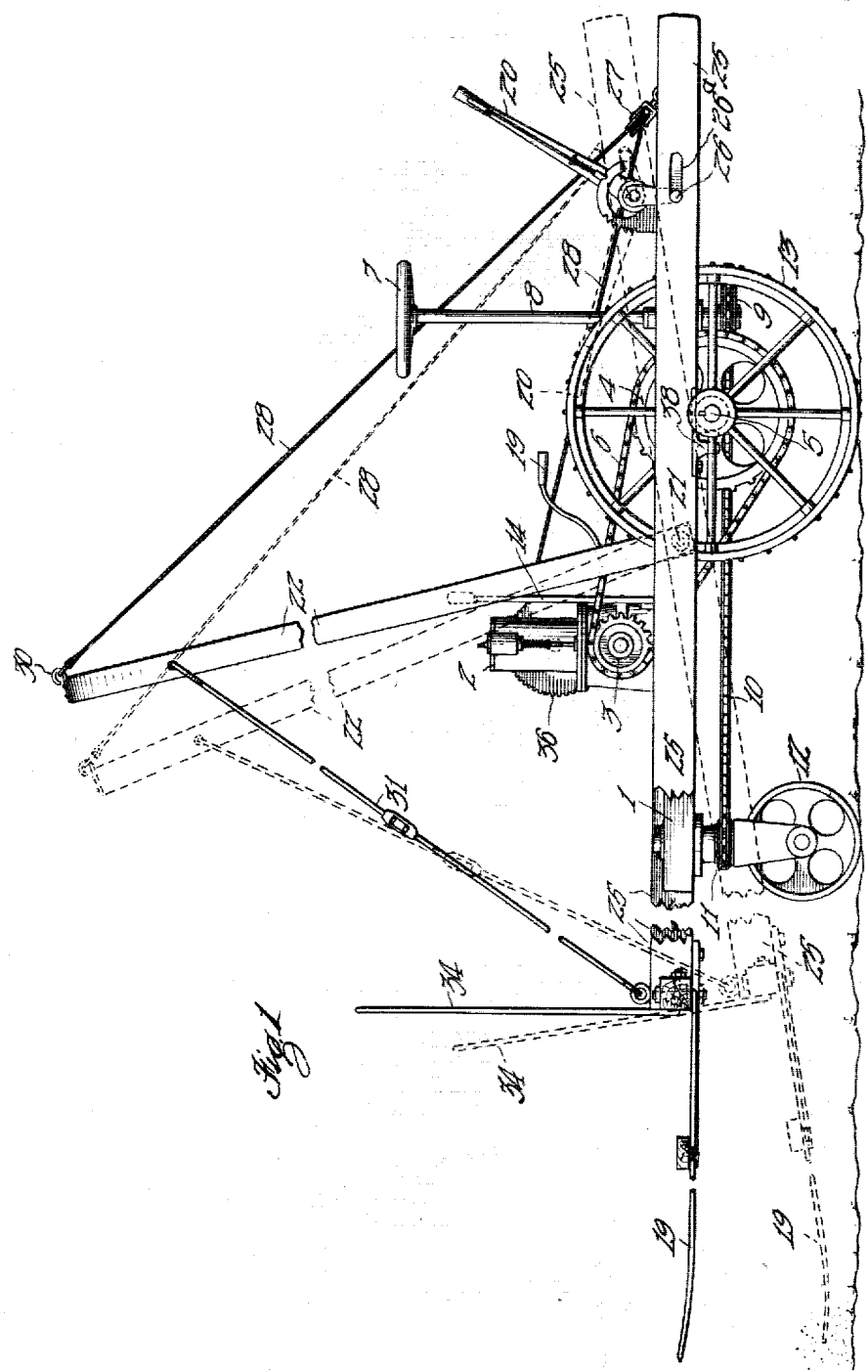

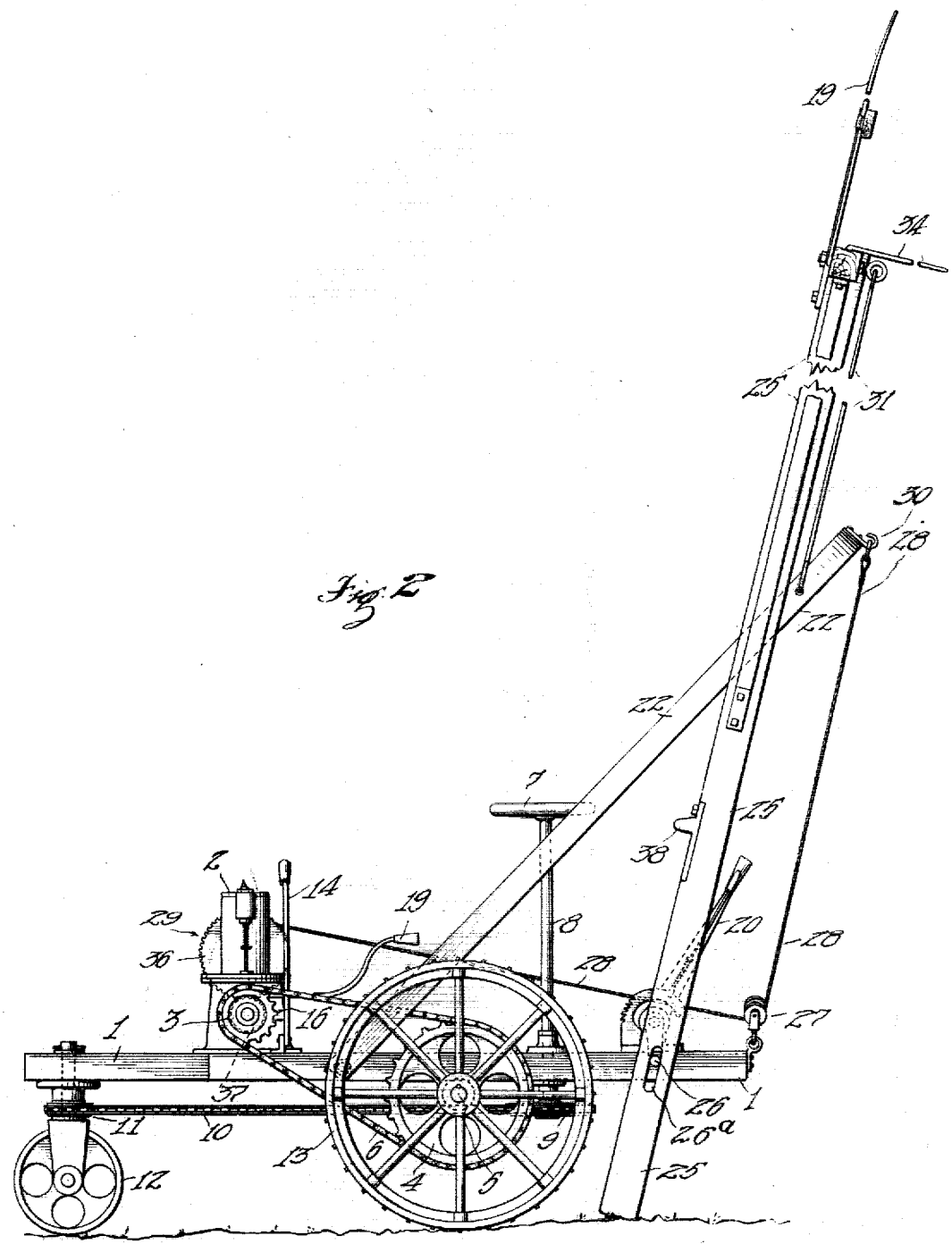

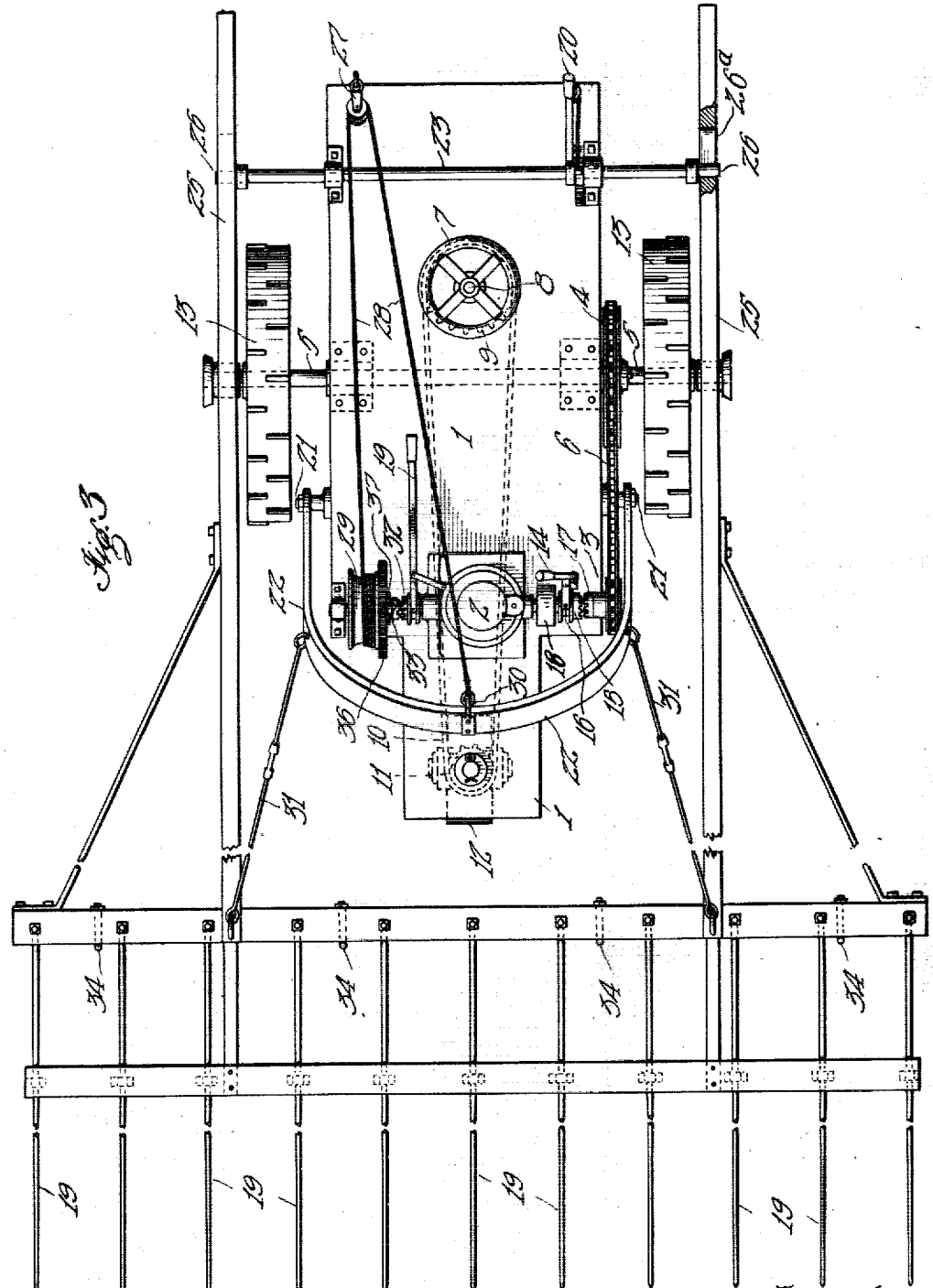

UNITED STATES PATENT OFFICE.

JACOB E. LIEBHART, OF TOLUCA, CALIFORNIA.

COMBINED HAY BUCK AND STACKER.

No. 853,557.   Specification of Letters Patent.   Patented May 14, 1907.

Application filed October 15, 1906. Serial No. 338,940.

*To all whom it may concern:*

Be it known that I, JACOB E. LIEBHART, a citizen of the United States, residing at Toluca, in the county of Los Angeles and State of California, have invented new and useful Improvements in a Combined Hay Buck and Stacker, of which the following is a specification.

The object of my invention is to provide a device having means for its self propulsion which will readily buck hay in its loose position on the ground, carrying it to the desired location and there stack the same.

I accomplish this object by means of the device described herein and illustrated in the accompanying drawings in which:—

Figure 1—is a side elevation of my improved buck and stacker, partly broken away, the dotted lines showing it in position for bucking the hay to be stacked and in full lines in its position while being moved. Fig. 2—is a side elevation thereof, the parts being shown in its vertical position which it assumes when unloading the hay onto the stack. Fig. 3—is a plan thereof, broken away in parts.

My device, being self propelled is adapted to be run into the field, and gather the hay to be stacked from cocks, rows or piles and transport the same to the place where it is to be stacked, and stack it.

In the drawings 1 is the frame or bed of the device upon which the engine 2 is mounted, upon the crank shaft of which is keyed a sprocket 3. For the purposes of my invention I have shown a gasolene engine of ordinary construction adapted for placement on a frame and to transmit motion to the rear axle through a sprocket 4 keyed to the driving axle 5, a sprocket chain 6 transmitting motion from the front sprocket on the crank shaft of the engine to the rear sprocket on its driving axle. The device is steered by means of the steering wheel 7 mounted on the steering column 8. Keyed to the lower end of the steering column is a sprocket 9, a sprocket chain 10 extends forwardly and around a sprocket 11 on the guide wheel 12. This will be seen, is manipulated by the steering wheel 7. Keyed to the driving shaft 5 are the driving wheels 13. Now, when it is desired to convert the device into a self propelled vehicle the hand lever 14 is thrown to the left. This will carry with it the clutch 15, which has a longitudinal movement on the crank shaft (but is non-rotative thereon) by means of the engaging yoke 16 mounted upon the hand lever 14. This will throw the clutch 15 into locked engagement with clutch 17 and impart movement to sprocket chain 6 and thereby move the device. A reverse movement is imparted to the sprocket wheel 3 and causes the device to move backwardly by throwing the hand lever 14 to the right to the limit of its stroke by means of the mechanism contained in the casing 18. This reversing mechanism, for reverse movement, is not shown as it is of the ordinary construction and embodies no novelty. Movement being imparted to the device as shown the stacker is guided by the steering wheel 7 to the position desired, the gathering fork 19 being dropped for operation into the dotted position shown in Fig. 1. The forks are thrown into this dropped or operative position by moving forwardly the segment lever 20 into the dotted position shown in Fig. 1, the swinging yoke 22 having a pivotal movement on and supported by the bolt 21 on the main frame.

On the fork supporting frame 25 I have placed lugs 38 which when the frame is in its dropped position will drop in front of the axle 5 and contact therewith and hold the fork in its forward position when in operation in bucking the hay to be loaded.

The outwardly projecting fork tines 19 are mounted upon the projecting end of the fork carrying frame 25. This frame has a swinging movement on the wrist pin 26 on the revoluble shaft 23, operating in the elongated slot 26ª. On the rear end of the frame is mounted the block 27 through which the rope 28 renders. This rope is securely fixed at one end to the revoluble drum 29. This drum is revolubly mounted in bearings in the frame and has on the outer periphery thereof spur gear 36 which meshes with a pinion 37 on the crank shaft. This rope is attached at its outer end to the hook 30 secured to the free end of the swinging yoke 22. Extending downwardly from the yoke 22 to the free end of the fork frame 25 are the guy rods 31 workably connecting the swinging yoke 22 with the forward end of the fork carrying frame 25. Now when it is desired to throw the fork from its depressed position shown in dotted lines in Fig. 1 into its elevated position as shown in Fig. 2 the lever 19 is thrown to the left carrying the yoke on the other end thereof outwardly and moving the clutch 32 into engagement with clutch 33 rigidly secured to the rope winding drum 29. This will cause the rotation of the drum and wind up the rope 28 throwing the fork and its supporting frame into its elevated or unloading position shown in Fig. 2. The clutch 32 has a longitudinal movement on the crank shaft, but is non-rotative thereon and the rope winding drum 29 is thrown into or out of engagement with the engine by the operation of the lever 19. When power is applied to the winding drum and the rope 28 rapidly wound thereon the forks and the outer end of the supporting frame will move up rapidly until the lower end of the fork supporting frame contacts with the ground when it will be brought to a more or less abrupt stop, jarring and throwing the hay backwardly and off of the upwardly projecting tines 34 which are then in a nearly horizontal position, the outwardly projecting ends being slightly depressed. This position will always insure the removal of the hay from the fork and toss the same outwardly and backwardly therefrom into space permitting it to drop upon the stack being formed thereunder.

Having described my invention what I claim as new and desire to secure by Letters Patent is:—

1. In a device of the character described, the combination of an oscillatory fork-carrying frame, hoisting mechanism, and means for fulcruming the fork-carrying frame at an intermediate point during a portion of its oscillation and for changing the fulcrum or pivotal point to a point on the ground to increase the throw or movement thereof.

2. In a device of the character described, the combination with a vehicle, of a fork carrying frame having sliding pivotal connection with the vehicle, and means for throwing it upwardly into a position so that one end rests upon the ground upon which end it is swung by the said lifting means.

3. In a device of the character herein described, the combination with a vehicle frame, of a fork carrying frame having elongated slots, a fork, a revoluble shaft having cranks, said cranks having wrist pins which enter said slots, a winding drum, a yoke connected to the fork carrying frame, means connecting the winding drum and yoke whereby the fork carrying frame is tilted, the wrist pins forming a pivot upon which the fork carrying frame swings, and means for elevating the fork carrying frame on said wrist pins until one end of the frame rests upon the ground, after which the frame is further swung upon the ground to an approximately vertical position, whereby the hay is automatically thrown from the fork when raised to said vertical position.

4. In a device of the character herein described, a vehicle, a fork carrying frame pivotally connected therewith, means to elevate or lower the front end of the fork carrying frame, said means comprising a revoluble shaft mounted on the vehicle, this shaft having a crank by which it has sliding pivotal connection with the fork carrying frame, and an adjustable lever secured to the shaft for regulating the same.

5. The combination with a vehicle frame, of a fork carrying frame supported by the vehicle frame, a yoke pivotally connected to the fork carrying frame, a connection extending from the yoke to the fork carrying frame, means carried by the vehicle for tilting the fork carrying frame in one operative position, and independent means for swinging the fork carrying frame on the first mentioned means whereby to throw it into an approximately vertical position.

6. The combination of a self propelled vehicle, steering mechanism, a fork carrying frame carried by the vehicle, a revoluble shaft having cranks thereon, to which cranks the fork carrying frame is pivotally connected, means on the shaft for turning it whereby to tilt the fork carrying frame into one operative position, a pivotally mounted yoke, rods extending from the yoke to the fork carrying frame, a sheave carried by the vehicle, a flexible device extending from the yoke around the sheave, and a drum operating by the propelling means of the vehicle to which one end of the flexible connection is secured, and means for causing the drum to wind the flexible connection thereon, whereby to raise the fork carrying frame to an approximately vertical position.

In witness that I claim the foregoing I have hereunto subscribed my name this 8th day of October, 1906.

JACOB E. LIEBHART.

Witnesses:
HENRY T. HAZARD,
G. E. HARPHAM.